United States Patent [19]

Edmunds et al.

[11] 4,388,989

[45] Jun. 21, 1983

[54] CONTINUOUS ROTARY METHOD OF TRANSPORTING ARTICLES

[75] Inventors: George W. Edmunds, Derwood, Md.; George S. McVeigh, Springfield; Werner H. Schmitt, Falls Church, both of Va.

[73] Assignee: Hoppmann Corporation, Chantilly, Va.

[21] Appl. No.: 286,113

[22] Filed: Jul. 23, 1981

[51] Int. Cl.³ .............................................. B65G 47/00
[52] U.S. Cl. .................................... 198/339; 198/345; 198/372; 198/481
[58] Field of Search ............... 198/345, 346, 481, 370, 198/372, 339, 441, 341

[56] References Cited

U.S. PATENT DOCUMENTS

| | | |
|---|---|---|
| 2,656,964 | 10/1953 | Detrez ................................. 198/345 |
| 3,587,820 | 6/1971 | Lachaussee ......................... 198/481 |
| 3,687,261 | 8/1972 | Guckel ................................. 198/803 |
| 4,306,646 | 12/1981 | Magni ................................. 198/341 |
| 4,326,624 | 4/1982 | Ewertowski et al. .............. 198/372 |

Primary Examiner—Joseph E. Valenza
Assistant Examiner—Jonathan D. Holmes
Attorney, Agent, or Firm—David H. Semmes; Warren E. Olsen

[57] ABSTRACT

Rotary transport of singulated articles, i.e., utilizing the periphery of a rotating transport disc to advance an article from one stationary work station to another. Particularly, radially outwardly pushing the article from the rotating transport disc into the peripheral stationary work station and, as work is completed upon the article, sequentially pushing the article radially inwardly from the work station into re-engagement with the rotating disc periphery, which transports the article to another work station or exit.

6 Claims, 3 Drawing Figures

4,388,989

CONTINUOUS ROTARY METHOD OF TRANSPORTING ARTICLES

BACKGROUND OF THE INVENTION (1) Field of the Invention

Rotary transport of singulated articles, i.e., utilizing a rotating transport disc to advance the article from one stationary work station to another. Particularly, radially outwardly pushing the articles from the rotating transport disc into the periphery stationary work station and, sequentially pushing the articles radially inwardly from the work station into re-engagement with the rotating transport disc periphery which transports the article to another work station or exit.

(2) Description of the Prior Art

MAY U.S. Pat. No. 2,447,197
DETREZ U.S. Pat. No. 2,656,964
GLOCKER U.S. Pat. No. 3,036,693
WILSON U.S. Pat. No. 3,112,562
DOERFLING U.S. Pat. No. 3,343,645
AVERY et al. U.S. Pat. No. 3,461,535
GARETTO U.S. Pat. No. 3,647,043
GUCKEL U.S. Pat. No. 3,687,261
VERHOEST U.S. Pat. No. 3,802,050
BROWN et al. U.S. Pat. No. 3,802,184
POMERNACKI U.S. Pat. No. 3,896,539

The above-listed references are discussed in a Prior Art Statement being filed separately.

SUMMARY OF THE INVENTION

According to the present invention, singulated parts to be worked upon are advanced within the periphery of a rotating transport disc to one or more stationary work stations, positioned adjacent the path of rotation. As the article is aligned with the work station, the article is pushed radially outwardly from the periphery of the transport disc into the stationary work station. As work is completed upon the article, the article is pushed radially inwardly into re-engagement within the periphery of the rotating transport disc and, thence, transferred to another work station or exit. The method is characterized by its continuous motion, yet high output rate of transported articles and a highly favorable ratio of work function time to article transport time.

DESCRIPTION OF THE PREFERRED EMBODIMENTS

According to the present method, parts to be assembled are continuously transported in a rotary arc from one work station to another, thence to a tangential exit. Conventional machines which assemble several parts are basically comprised of two or more work or assembly stations and a linear transport mechanism to carry the in-process assembly from one station to another. Assembly machines are basically classified according to the type of transport mechanism employed, i.e., intermittent motion or continuous motion. Each system has disadvantages as follows:

(1) The conventional intermittent motion transport requires that the transporting machinery stop and start at every cycle. Additionally, the transport time is relatively long, resulting in slow production rates.

(2) The continuous motion transport requires multiple and complex tooling stations, since the assembly or work functions are performed while the transport is moving.

This invention concerns an assembly machine which eliminates the disadvantages, while retaining the advantages of both systems. This invention uses a continuously rotating disc to transport the in-process parts or assemblies, yet utilizes stationary stations, i.e., work stations which are positioned outside the transport disc periphery to perform the work. This is accomplished by the use of continuous rotary motion techniques to transport or distribute and pick up the parts at each work station.

Figure 1:
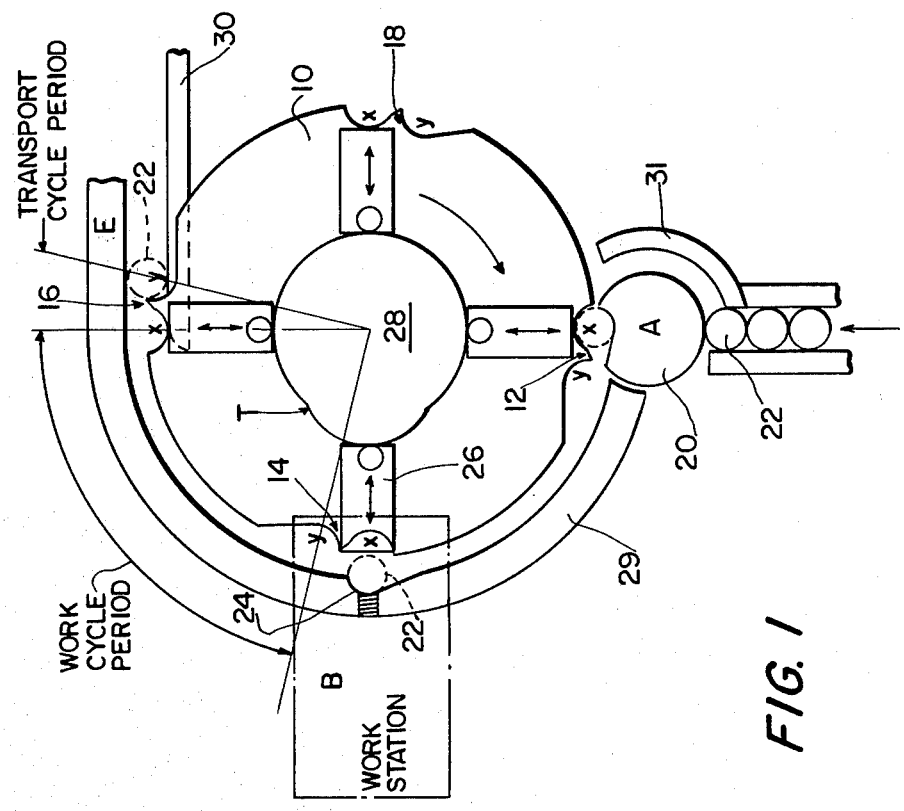
FIG. 1 is a top plan schematic view of an installation for continuous rotary transport of singulated articles from a transfer station located at "A" to a work station located at "B" and thence, exit at "E".

FIG. 1 shows a basic assembly system. Parts 22 to be assembled or worked upon are delivered into the system at "A", work is performed at "B", and the completed part is exited tangentially at "E". The transport system consists of a rotating disc 10 containing four peripheral transport notches or stations 12, 14, 16, 18, with spacing in 90 degree increments. Each transport station or notch contains two pockets "X" and "Y".

As rotating disc 10 passes entry point "A", parts 22 are transferred conventionally into pocket "X", in this case using a geared transfer wheel 20 and guide 31. As disc 10 approaches work station "B", part 22 is pushed axially outwardly by means of rotary cam 28 and pusher bar 26 into stationary nest 24, defined in peripheral guide 29. The part 22 which was previously in nest 24 had been spring-urged radially inwardly for removal from nest 24 and placement in transport station leading edge pocket "Y". Part 22 may be removed tangentially by stripper bar 30, or the like.

There are a number of features which may be noted, for example:

(1) The number and spacing of the stationary work stations 24 bear no relation to the number and spacing of the transport stations 12, 14, 16 and 18. For instance, there may be four transport stations 90 degrees apart and six stationary work stations 60 degrees apart.

(2) The spacing of the stationary work stations 24 may vary, i.e., two work stations may be 90 degrees apart and the third work station may be 60 degrees from the second work station.

(3) Since transport disc 10 is rotating continuously, there are no stringent tolerance requirements between disc 10 and the work stations 24, as in standard intermittent-motion systems.

(4) The dwell time or the period during which work can be performed at the work station is the time required for disc 10 to rotate from the leading pocket "X" to the trailing pocket "Y" in the succeeding transport station, see FIG. 1.

(5) The time required to transfer parts into and out of the stationary work station or nest 24 is the time required for disc 10 to rotate from pocket "Y" to pocket "X" within the same transport station. As may be observed in FIG. 1, the ratio of work cycle time to transport cycle time is quite large. Consider a 36 inch diameter disc with eight transport stations, rotating at 6 rpm with a part 22 one inch in diameter.

Figure 2:
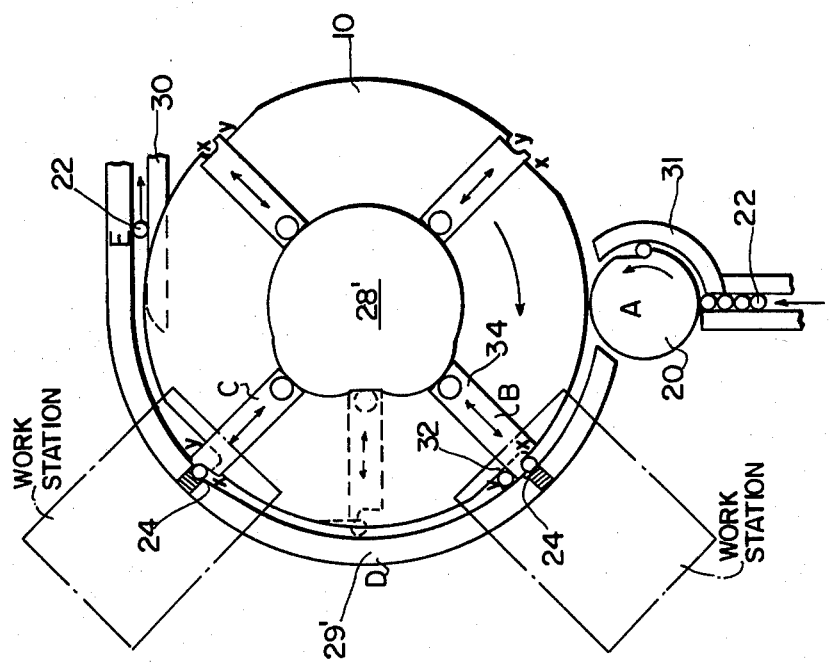
FIG. 2 is a top plan schematic view of an installation according to the present method, wherein the singulated articles are advanced to two work stations, "B" and "C", thence, exit at "E".

Output rate: 48 ppm
Linear circumferential speed (This is quite slow for continuous motion transports): 678 in/min
Work function time: 0.098 sec
Part transfer time: 0.026 sec
Overall cycle time: 0.125 sec FIG. 2 shows a system with two work stations at "B" and "C". A new requirement is evident in this case. As the completed part leaves work station "B", it is placed into transport station 32 pocket "Y". This part must be transferred to transport station pocket "X" before work station "C" is reached. This transport from pocket "Y" to "X" is accomplished by configuring the end of pusher bar 34 to divide unitary cavity 32 into two pockets, "X" and "Y". At some point between work stations "B" and "C", pusher bar 34 is withdrawn allowing part 22 to move from forward pocket "Y" to the back edge of cavity 32, i.e., pocket "X". This is illustrated as occurring at point "D" in FIG. 2.

In many cases the part or assembly 22 being handled has an exterior configuration which is not readily adaptable to the type of rotary transfer methods herein described. Such parts can be handled by placing the entire part within a carrier or puck, having a cylindrical outside surface, which is well adapted to the required transfer methods.

Figure 3:
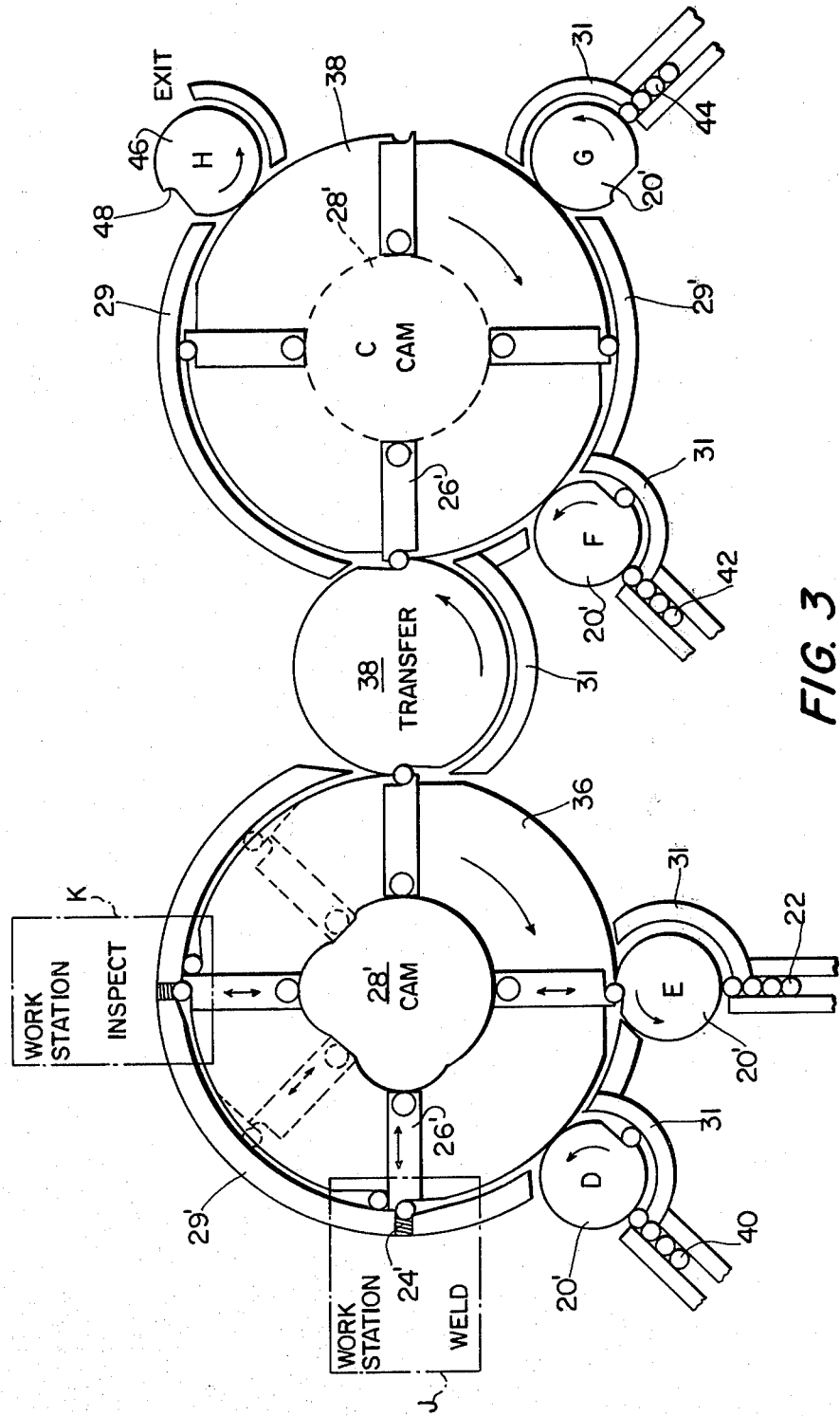
FIG. 3 is a top plan schematic view of a modification, according to the present invention, wherein two series of singulated articles "D" and "E" are transported sequentially to work stations "J" and "K", thence transferred to a second rotating transport disc for assembly of a third and fourth series of singulated articles "F" and "G" into the rotary transport disc, prior to exit at "H".

Since disc 10 rotates continuously, it is easily interfaced with other continuous motion assembly turrets. FIG. 3 is a schematic representation of such a system. Singulated parts 22 and 40 at "D" and "E" are transferred into rotating disc 36, the parts are welded at work station "J", inspected at work station "K", transferred on rotating wheel 38, and placed into continuous motion assembly turret or disc 38 where they are assembled with singulated parts 42, 44 at "F" and "G", while the turret or disc 38 rotates continuously. The completed assembly of parts 22, 40, 42, 44 is exited tangentially at "H" by means of rotating disc 46, having peripheral removal notch 48.

There are manifest mechanical variations of this invention. The transport system, of course, does not have to have rotary motion and, in fact, may be provided with linear motion, such as that obtained by using a belt or chain to carry the transport pockets.

We claim:

1. Continuous rotary method of transporting articles with respect to a stationary work station comprising:

(A) moving an article into engagement with a pocket defined within the periphery of a rotating disc;
(B) transporting said article within a rotary arc, defined by said rotating disc;
(C) sequentially pushing said article radially outwardly from said pocket within rotating disc and into a stationary work station;
(D) pushing said article radially inwardly and reengaging said article within the periphery of said rotating disc, such that said article may roll along the periphery of the disc until it reaches the next pocket; and
(E) tangentially disengaging said article from the periphery of said rotating disc.

2. Continuous rotary method of transporting articles with respect to a stationary work station as in claim 1, including circumferentially guiding said article during said transporting in engagement within the periphery of said rotating disc.

3. Continuous rotary method of transporting articles with respect to a stationary work station as in claim 2, wherein a first series and a second series of singulated articles are moved into engagement within the periphery of said rotating disc, pushed into said stationary work station, re-engaged within the periphery of said rotating disc and tangentially discharged therefrom.

4. Continuous rotary method of transporting articles with respect to a stationary work station as in claim 3, including pushing said articles radially outwardly from said rotating disc into a plurality of stationary work stations circumferentially positioned with respect to said rotating disc, then sequentially pushing said articles radially inwardly towards said rotating disc, re-engaging and tangentially discharging said articles.

5. Continuous rotary method of transporting articles with respect to a stationary work station as in claim 4, wherein said articles are transported simultaneously within a first rotating disc and work station sector and a second rotating disc and work station sector, including radially outwardly pushing articles from said first rotating disc sector into the periphery of a transfer rotating disc, then moving said articles into engagement within the periphery of a second rotating disc and sequentially pushing said articles radially outwardly from said second rotating disc and into a transfer station.

6. Continuous rotary method of transporting articles with respect to a stationary work station as in claim 5, including transporting a third and fourth series of singulated articles into the periphery of said second rotating disc, sequentially of moving said article into engagement within the periphery of said second rotating disc and sequentially pushing all said articles radially outwardly from said second rotating disc into a tangentially positioned exit station.

* * * * *